No. 612,018. Patented Oct. 11, 1898.
H. R. COLLINS.
VEHICLE WHEEL.
(Application filed Nov. 5, 1897.)
(No Model.) 2 Sheets—Sheet 1.
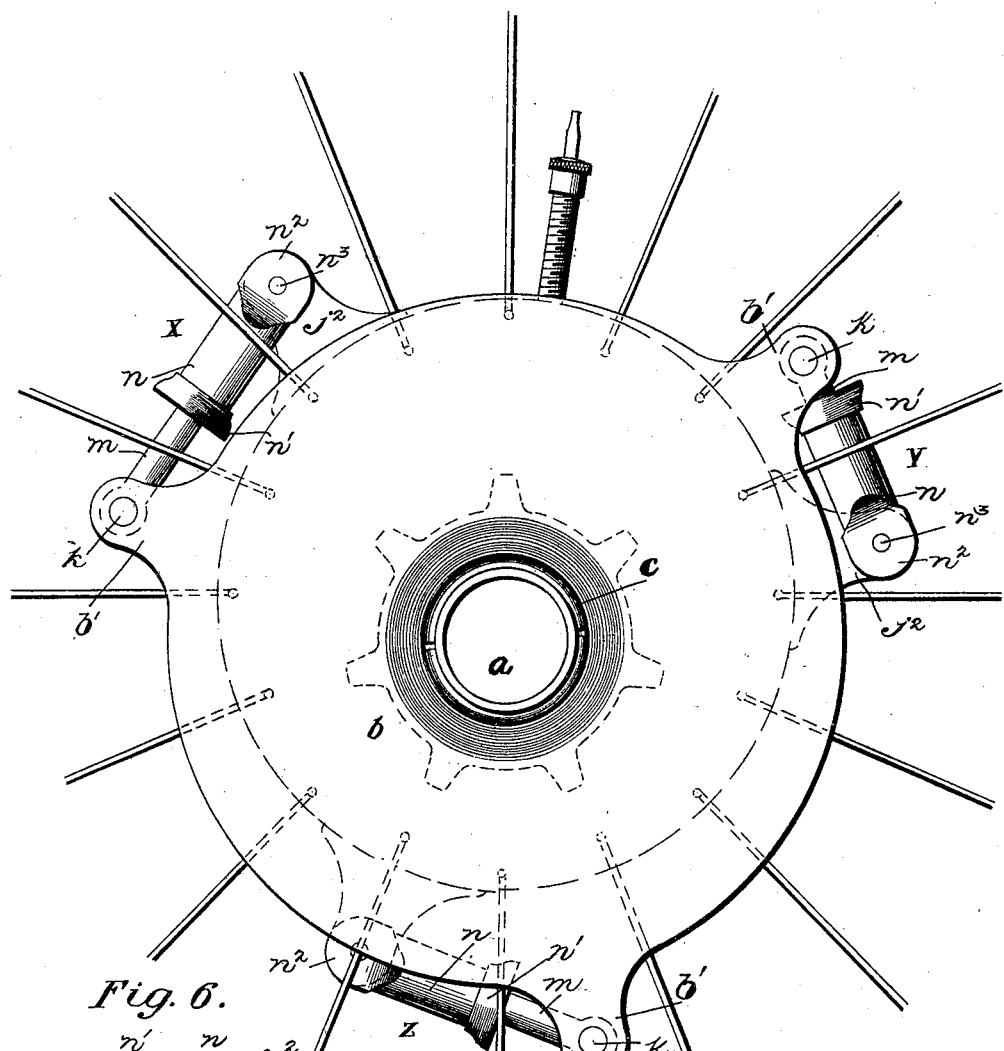
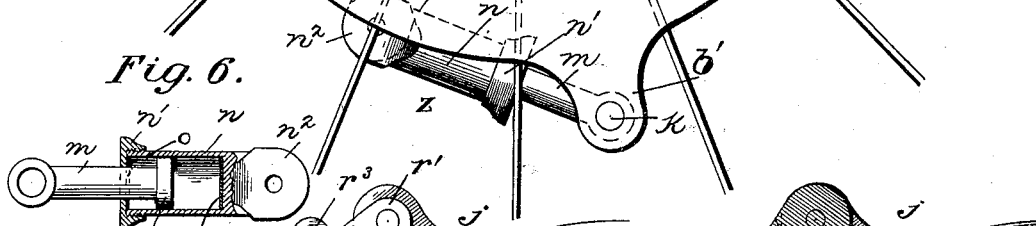
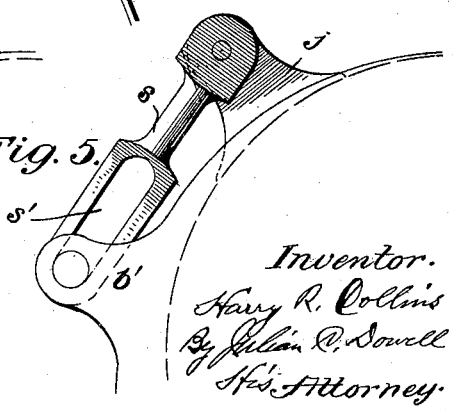

No. 612,018. Patented Oct. 11, 1898.
H. R. COLLINS.
VEHICLE WHEEL.
(Application filed Nov. 5, 1897.)
(No Model.) 2 Sheets—Sheet 2.
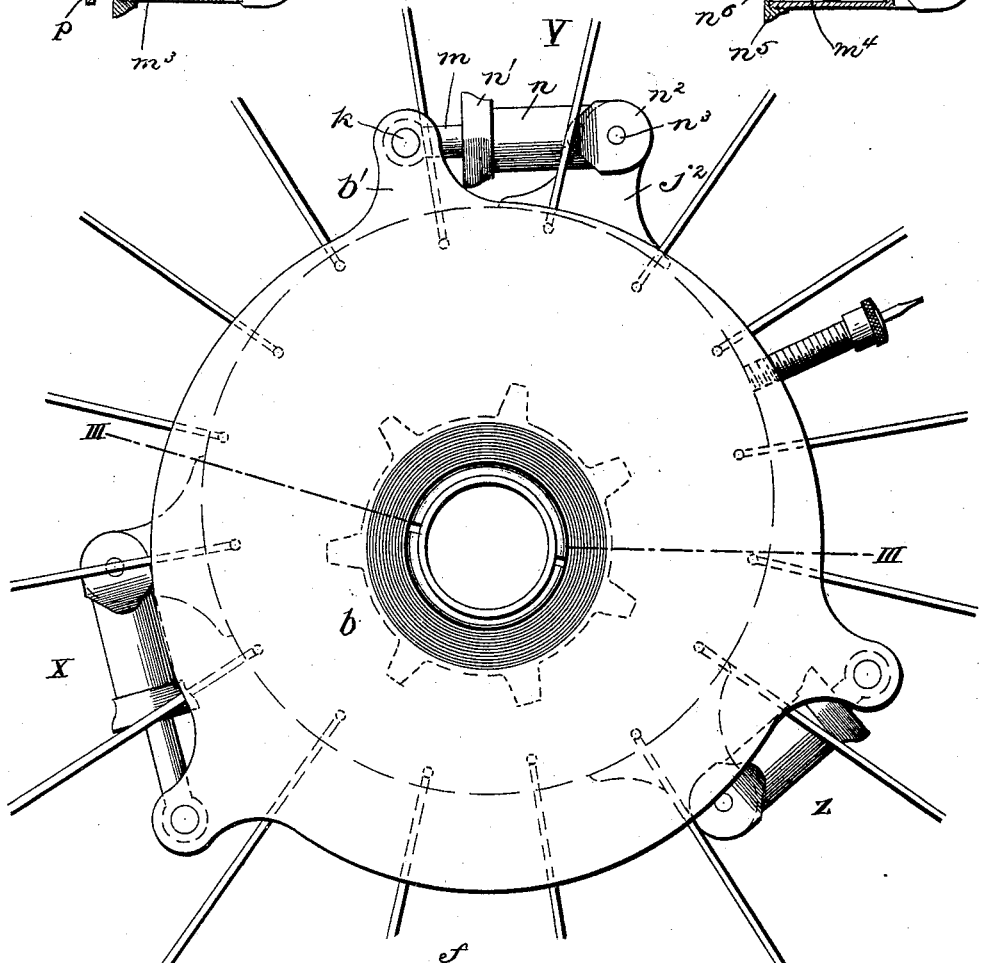

UNITED STATES PATENT OFFICE.

HARRY RAYMOND COLLINS, OF SOUTH BETHLEHEM, PENNSYLVANIA, ASSIGNOR TO THE COLLINS PNEUMATIC HUB AND WHEEL WORKS, OF PENNSYLVANIA.

VEHICLE-WHEEL.

SPECIFICATION forming part of Letters Patent No. 612,018, dated October 11, 1898.

Application filed November 5, 1897. Serial No. 657,496. (No model.)

*To all whom it may concern:*

Be it known that I, HARRY RAYMOND COLLINS, a citizen of the United States, residing at South Bethlehem, in the county of Northampton and State of Pennsylvania, have invented certain new and useful Improvements in Vehicle-Wheels; and I do hereby declare the following to be a full, clear, and exact description of the invention, such as will enable others skilled in the art to which it appertains to make and use the same.

This invention relates to that class of vehicle-wheels wherein a cushioning effect is produced at the hub rather than at the rim, so as to dispense with a pneumatic tire, while retaining the substantial advantages of the same and obviating its objectionable features. In general constructions such a wheel has a hub proper, sleeve or axle-box, a spoke-ring around the same and radially movable relatively thereto, and a pneumatic tube interposed between the spoke-ring and hub. When this general construction is employed in a driving or traction wheel, it is evident that the hub and spoke-ring must be rotatively connected in a positive manner. To accomplish this without lost motion, while at the same time allowing perfect freedom for relative radial play between the hub and spoke-ring in all directions, and yet maintaining an unvarying leverage in the driving connections, and also distributing the points of rotative engagement sufficiently to insure an effective driving connection, has proved something of a problem. Various expedients have been resorted to with the object of satisfying the requirements in this particular, but have been found in practice to be deficient in one way or another. A slot-and-pin connection is deficient in that a change of leverage therein accompanies relative radial movements of the hub and spoke-ring, and a distribution of the points of engagement by a duplication of the connection unduly limits the amount of radial play between the parts. A simple link connection is deficient in that it cannot be duplicated to distribute the points of rotative engagement between the parts without fatally impairing the cushioning effect by obstructing relative radial movements of the hub and spoke-ring. I propose by my invention to thoroughly accomplish the hereinbefore-explained desideratum in a driving connection between the hub and spoke-ring and to effect this in a practical manner, avoiding the complicated constructions which have resulted from attempts heretofore made in the same direction.

To this end the invention provides a number of sets of automatically-extensible link connections between the hub and spoke-ring distributed about the peripheral portions of said wheel parts and successively affording a positive driving connection between the same, one set being fully extended, while the others accommodate themselves freely to radial movements of the spoke-ring relative to the hub which accompany the cushioning action between these parts.

The invention is capable of embodiment in numerous ways, some of which are illustrated in the drawings accompanying and forming part of this specification, and these illustrated forms of embodiment of the invention are specifically described hereinafter, while the appended claims point out essential elements of the invention.

Of the said drawings, Figure 1 represents in side elevation the central portion of a wheel with three sets of extensible link connections of one form applied thereto and shown in the respective conditions they assume when there is a load on the hub. Fig. 2 represents a similar view with the sets of link connections differently positioned. Fig. 3 represents an axial section of the wheel, taken on line III III of Fig. 2. Figs. 4 and 5 represent in side elevation different forms of link connections. Fig. 6 represents a sectionalized side elevation of the link connection shown in Figs. 1 and 2. Figs. 7 and 8 represent views similar to Fig. 6, illustrating modifications.

In the drawings the reference-letter $a$ designates the hub proper, which is in the form of a sleeve adapted to surround and rotate upon a fixed axle or shaft, with interposed ball-bearings, as common in bicycles and other vehicles. The said sleeve is formed with circumferential segmental ribs $a'$, and there are fitted upon the sleeve two disks $b$, with segmental flanges which fit between the said ribs, whereby the disks and sleeve are rotatively engaged in a positive manner with each other, as will be obvious. The disks are securely held in place by means of the following-described instrumentalities: A ring $c$ is screwed onto the sleeve and against one of the disks and holds the same in close engagement with the segmental ribs with which it interlocks. A loose collar $d$ fits over the sleeve and against the other disk, and a sprocket-wheel $e$ screws onto the sleeve and against said collar, holding the latter in close engagement with the disk. A lock-ring $f$ screws onto reverse threads in the sleeve and against the sprocket-wheel. This construction is especially adapted to bicycles, and it will be seen that the sprocket-wheel is utilized as a means for clamping the disk, making a compact and effective arrangement.

By the above-described devices it will be seen that the disks are immovably fastened to the sleeve and practically constitute a pair of flanges on the same, between which flanges is confined a saddle composed of two sections or thimbles $g$, surrounding the sleeve and lying over the segmental ribs on the same and the segmental flanges on the disks. The meeting edges of said thimbles are formed with interlocking projections $g'$, as indicated in broken lines in Fig. 3, whereby they are rotatively connected, it being understood that while the inner walls of the disks lie in close proximity to the outer edges of the thimbles the latter are free to turn on the sleeve. Roller-bearings are interposed between the thimbles and the sleeve, said bearings being in the form of cylindrical rolls $h$, confined endwise by the segmental ribs and flanges between which they lie, as clearly shown in Fig. 3.

The interlocked thimbles together constitute a saddle for a pneumatic tube $i$, which surrounds the same between the disks $b$, free space being allowed for expansion and flattening of said tube, as will be seen. This pneumatic tube is embraced by a ring $j$, to which the spokes $j''$ are fastened, the said ring having flanges $j'$ extending parallel with the disks, and packing-rings being interposed to form an efficient closure for excluding dirt and dust, while permitting relative radial movements of the hub and spoke-ring.

The spoke-ring and pneumatic tube are fixedly secured together, preferably by means of the inflating-valve parts.

The devices thus far described are for the most part the same as in my companion application, Serial No. 644,685, filed July 15, 1897.

The extensible link connections, which form the gist of the present invention, will next be described with reference first to Figs. 1 and 2. Each of the disks or hub-flanges is formed with a number of radial projections $b'$, (three in the present instance,) and they pair with the projections on the other disk, and each pair of projections supports a cross-rod or pull-bar $k$, upon which is pivotally mounted one end of a rod $m$, carrying at its other end a piston $m'$. (See Fig. 6.) This piston is inclosed by a cylinder $n$, having at one end a screw-cap $n'$, closely embracing the piston-rod, and being formed at the other end with a bifurcated ear $n^2$, which straddles a radial projection $j^2$ on the spoke-ring $j$, to which it is pivoted by a pin $n^3$, there being three of such projections on the spoke-ring to correspond with the three radial projections on each disk $b$. The parts just described constitute an automatically-extensible link connection between the spoke-ring and hub, permitting relative radial movements of the same, while successively constituting driving connections, for it will be seen by reference to Fig. 1 that when one of the connections X is fully extended the next succeeding connection Y is fully contracted and third connection Z is partially contracted. The spoke-ring is here indicated by a broken line to illustrate its eccentric relation to the hub when there is a load on the latter, and it will be observed that it is due to such relation of the parts that the respective conditions of the several sets of link connections obtain. Fig. 2 illustrates the changes which take place in these connections when the wheel has turned somewhat beyond the position shown in Fig. 1. The connection at X is still fully extended and affording a driving connection, while the connection at Y has commenced to extend and the connection at Z has contracted. It will thus be seen that there is no obstruction to ample relative radial play between the hub and spoke-ring, while at the same time there is constantly provided a positive driving connection between these parts with no lost motion and no change of leverage, and, moreover, the points of connection between the hub and spoke-ring are effectively distributed around the peripheral portions of these parts.

In the construction shown in Fig. 6 the piston $m'$ fits the base of the cylinder loosely enough to permit passage of air from one side to the other, but in such a restricted way as to insure a cushioning effect. The heads of the cylinder are faced on the inside with pieces $o$ of leather or other suitable sound-deadening and cushioning material.

In the construction shown in Fig. 7 the piston $m^2$ has a packing-ring $m^3$, forming a tight fit against the interior wall of the cylinder, and the latter is provided near its ends with small vent-holes $n^4$. There is also a stuffing-box $p$ around the piston-rod. It will be seen that with this construction air is trapped in each end of the cylinder and a cushion formed thereby, which prevents contact between the piston and cylinder heads.

In Fig. 8 the construction is quite similar to that shown in Fig. 6, except that a spiral cushioning-spring $q$ is interposed between the piston and screw-cap $n^5$, forming one head of the cylinder, said spring embracing bosses $n^6$ and $m^4$ on said cap and piston, respectively, and one or both of said bosses being faced with leather or other suitable material.

In Fig. 4 a form of extensible link connection is illustrated comprising three members $r$, $r'$, and $r^2$, two of which are pivoted, respectively, to the pull-bar on the hub and the radial projection on the spoke-ring, and the third pivoted to the first two and formed with lateral projections $r^3$ to abut the same and limit the extension movement. When such projections abut the edges of the members $r$ and $r'$, as shown in the drawings, it will be seen that a positive driving connection is effected, while at the same time a dead-center is avoided, so as to permit perfect freedom to contract and allow the desired radial movement between the hub and spoke-ring.

In Fig. 5 a single link $s$ is shown, pivoted at one end to the radial projection of the spoke-ring and having a longitudinal slot $s'$ embracing the pull-bar on the hub. It will be seen that this construction has the desired feature of extensibility, as well as those before described.

Any one of the constructions here shown will effectively accomplish the object primarily stated; but I prefer a form of connection such as illustrated in Figs. 1 and 2, as I have found this to yield the best results in practice. However, it is evident the invention may be embodied in other forms than those here shown and described, and hence I do not confine myself to any one of the same.

Having thus fully described my invention, what I claim as new, and desire to secure by Letters Patent of the United States, is—

1. In a wheel, the combination of a hub having side flanges or disks, a spoke-ring fitting between the latter with provision for radial play thereof and being provided with a number of radial projections at different points around its periphery, a number of sets of extensible link connections coupled to said projections respectively and to the hub-flanges and tangentially disposed to constitute driving connections between the hub-flanges and the spoke-ring, and a cushion interposed between the hub and spoke-ring.

2. In a wheel, the combination of a hub having side flanges or disks, a spoke-ring fitting between the latter with provision for radial play thereof and being provided with a number of radial projections at different points around its periphery, a number of sets of extensible link connections each comprising a piston and cylinder one of which is coupled to one of the radial projections on the spoke-ring and the other of which is coupled to the hub-flanges, said link connections being tangentially disposed to constitute driving connections between the hub-flanges and spoke-ring, and a cushion interposed between the hub and spoke-ring.

3. In a wheel, the combination with the hub and spoke-ring radially movable relatively to each other, and an interposed cushion; of extensible tangentially-disposed link connections between the hub and spoke-ring for driving purposes; said connections comprising a cylindrical member on one of said wheel parts, having vent-holes near its ends, and a piston-carrying member on the other of said wheel parts, with provision for effecting an intimate contact between the periphery of the piston and the interior wall of the cylinder.

4. In a wheel, the combination of the hub, sleeve, or axle-box, disks thereon in rotative engagement therewith, and means for confining the said disks on the hub, said means comprising a ring screwed on the hub against one of the disks, a sleeve on the hub fitting against the outer side of the other disk, a sprocket-wheel screwing on the hub against said sleeve, and a ring screwing on the hub against said sprocket-wheel.

In testimony whereof I affix my signature in presence of two witnesses.

HARRY RAYMOND COLLINS.

Witnesses:
P. E. STEM,
ROBT. J. PURCELL.